United States Patent Office 3,222,247
Patented Dec. 7, 1965

3,222,247
DIMETHYL FORMAMIDE MIXTURE AS A BACTERIOSTAT
Arthur F. McKay, Beaconsfield, Quebec, and Harold A. Baker, Montreal, Quebec, Canada, assignors to Monsanto Canada Limited, La Salle, Quebec, Canada, a Canadian company, and American Home Products Corporation, New York, N.Y., a corporation of Delaware
No Drawing. Filed June 20, 1961, Ser. No. 118,266
Claims priority, application Great Britain, June 24, 1960, 22,236/60
17 Claims. (Cl. 167—30)

This invention relates to improvements in or relating to substituted thionocarbamates having useful properties as bacteriostats.

The modified and improved thionocarbamates of this invention are obtained from the treatment of a substituted 3,4-dichlorophenylthionocarbamate with dimethylformamide for improvement in inhibiting the growth of bacteria.

In accordance with this invention the substituted 3,4-dichlorophenylthionocarbamates used in preparing these new products have the formula:

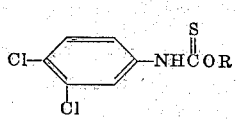

wherein R is a phenyl or a phenyl group substituted with at least one of the group consisting of a halogen atom, lower alkyl, lower alkoxy and a nitro radical. These compounds are disclosed in applications filed in Great Britain by Monsanto Canada Limited, namely application No. 1773, filed January 16, 1959, and application No. 19,936, filed June 10, 1959.

The modified thionocarbamate of this invention can be represented by the structure

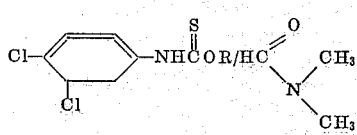

wherein R is as defined in the preceding formula.

Modified 3,4-dichlorophenylthionocarbamates of this invention are extremely potent bacteriostats for gram positive organisms. The bacteriostatic activity of these products is several hundred fold over that of untreated substituted 3,4-dichlorophenylthionocarbamates. The effect in increasing the bacteriostatic activity of substituted 3,4-dichlorophenylthionocarbamates by this invention is apparent in the comparison of the activity of untreated 4-methylphenyl 3,4-dichlorophenylthionocarbamate with that of the same compound when treated with dimethylformamide. The treated compound inhibited the growth of Staphylococcus pyogenes (penicillin sensitive) and Staphylococcus pyogenes (penicillin resistant) at a concentration of 1 part in 324,000,000 as compared with a minimum inhibition concentration of 1 part in 40,000 of 4-methylphenyl 3,4-dichlorophenylthionocarbamate.

The process for carrying out this invention comprises adding to a solution of dimethyl formamide a substituted 3,4-dichlorophenylthionocarbamate herein disclosed. An equivalent of the dimethylformamide in a suitable solvent, such as water, benzene, ethanol or common hydrocarbon solvents can be used. For example, the substituted 3,4-dichlorophenylthionocarbamate with one equivalent of aqueous dimethyl formamide solution will give the modified thionocarbamate of this invention. The temperature at which the treatment is carried out is normally at room temperature though higher temperatures may be used.

When the substituted 3,4-dichlorophenylthionocarbamates are treated in the liquid amide the products are recovered by evaporation of the excess treating agent. The product is sometimes recovered by removing the excess treating agent in vacuo.

The following examples are illustrative only and may be varied or modified without departing from the spirit and scope of this invention. (Parts are by weight.)

EXAMPLE I

*4-methylphenyl 3,4-dichlorophenylthionocarbamate/dimethylformamide*

One part of 4-methylphenyl 3,4-dichlorophenylthionocarbamate is mixed with one thousand parts of 50% by volume aqueous dimethyl formamide and heated at 50° C. for six hours. The resulting solution is a highly active bacteriostatic product.

EXAMPLE II

*3,4-dichlorophenyl 3,4-dichlorophenylthionocarbamate/dimethylformamide*

3,4-dichlorophenyl 3,4-dichlorophenylthionocarbamate (1.90 parts) is mixed in dimethylformamide (2 parts) for 2 hours. The resulting solution is a highly active bacteriostatic product.

EXAMPLE III

*4-ethoxyphenyl 3,4-dichlorophenylthionocarbamate/dimethylformamide*

One part of 4-ethoxyphenyl 3,4-dichlorophenylthionocarbamate is mixed with one thousand parts of dimethylformamide for 2 hours. The resulting solution is a highly active bacteriostatic product.

EXAMPLE IV

*2,6-di-t-butyl-4-methylphenyl 3,4-dichlorophenylthionocarbamate/dimethylformamide*

One part of 2,6-di-t-butyl-4-methylphenyl 3,4-dichlorophenylthionocarbamate in one thousand parts of dimethylformamide is treated for 2 hours. The resulting solution is a highly active bacteriostatic product.

EXAMPLE V

*3-nitrophenyl 3,4-dichlorophenylthionocarbamate/dimethylformamide*

One part of 3-nitrophenyl 3,4-dichlorophenylthionocarbamate in one thousand parts of dimethylformamide is heated at 75° C. for 1 hour. The resulting solution is a highly active bacteriostatic product.

The activity of the modified 3,4-dichlorophenylthionocarbamates of this invention was determined by standard anti-bacterial tests of which particulars are as follows on the products detailed in the examples with the results described below.

Halving dilutions were done on each compound, the initial dilution being 1/10,000 with serial dilutions up to 1/324,000,000. 0.1 millilitre of a 1/10 dilution of an 8-hour old culture of the test organism was in each case added to incubation tubes containing the various concentrations of the test compounds and the tubes incubated for a period of twenty-four hours at 37° C. The tubes were then examined to determine the presence of growth of the organism. This examination was done visually and the presence of growth indicated by turbidity. The medium employed was "Difco" nutrient broth. The results of the tests are tabulated in the attached table. In the table the substituted thionocarbamate may be identified by reference to the example.

MINIMUM INHIBITION CONCENTRATION—1/CONCENTRATION

| Modified Thionocarbamate | Staph. pyogenes (S) | Staph. pyogenes (R) | Sarcina lutea | Strept. faecalis | E. coli #198 | A. aerogenes | S. pullorum | Ps. aeruginosa | Pr. mirabilis | Pr. vulgaris |
|---|---|---|---|---|---|---|---|---|---|---|
| Example I | 324,000,000 | 324,000,000 | 20,480,000 | 10,240,000 | 20,000 | 10,000 | 10,000 | 10,000 | 20,000 | 20,000 |
| Example III | 16,000,000 | 16,000,000 | 16,000,000 | 4,000,000 | 10,000 | 10,000 | 10,000 | 10,000 | 10,000 | 10,000 |
| Example IV | 5,120,000 | 5,120,000 | 5,120,000 | 1,280,000 | 80,000 | 10,000 | 10,000 | 20,000 | 80,000 | 80,000 |
| Example V | 32,000,000 | 64,000,000 | 2,560,000 | 1,280,000 | 20,000 | 10,000 | 10,000 | 10,000 | 20,000 | 20,000 |

The modified thionocarbamates described hereinbefore are useful in inhibiting the growth of bacteria, e.g. *Staphylococcus pyogenes* (penicillin sensitive) by exposing the bacteria to same. The growth of bacteria on various surfaces, e.g. human or animal skin, other surfaces can be prevented by applying to such surfaces any one or mixture of modified products described hereinbefore or a composition or formulation containing same. The amount of modified product employed to control will vary obviously with the species of bacteria, with the amount of bacteria on a surface, the particular modified product and the like.

Although the modified products of this invention are useful per se in inhibiting a wide variety of noxious life, it is preferable that they be supplied to the noxious life or to the environment of the noxious life in a dispersed form in a suitable extending agent.

In the instant specification and appended claims it is to be understood that the term "dispersed" is used in its widest possible sense. When it is said that the modified products of this invention are dispersed, it means that the particles of the modified products, of this invention may be molecular in size and held in true solution in a suitable organic solvent. It means further that the particles may be colloidal in size and distributed throughout a liquid phase in the form of suspensions or emulsions or in the form of particles held in suspension by wetting agents. It also includes particles which are distributed in a semi-solid viscous carrier such as petrolatum or soap or other ointment base in which they may be actually dissolved in the semi-solid or held in suspension in the semi-solid with the aid of suitable wetting emulsifying agents. The term "dispersed" also means that the particles may be mixed with and distributed throughout a solid carrier providing a mixture in particulate form, e.g. pellets, granules, powders, or dusts and powders.

The exact concentration of the modified products this invention employed in combatting noxious life can vary considerably provided the required dosage (i.e. toxic or lethal amount) thereof is supplied to the noxious life or to the environment of the noxious life. When the extending agent is a liquid or mixture of liquids (e.g. as in solutions, suspensions, emulsions, etc.) the concentration of the modified product employed to supply the desired dosage generally will be in the range of 0.001 to 50 percent by weight. When the extending agent is a semi-solid or solid, the concentration of the modified product employed to supply the desired dosage generally will be in the range of 0.1 to 25 percent by weight.

What is claimed is:

1. The method of inhibiting the growth of bacteria which comprises exposing said bacteria to a bacteriostatic amount of a composition comprising dimethylformamide and 3,4-dichlorophenylthionocarbamate having the formula:

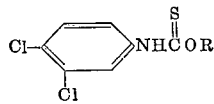

wherein R is selected from the group consisting of phenyl and phenyl substituted with at least one member selected from the group consisting of halogen atom, lower alkyl, lower alkoxy, and nitro.

2. The method of inhibiting the growth of bacteria which comprises exposing said bacteria to a bacteriostatic amount of a composition comprising dimethylformamide and phenyl 3,4-dichlorophenylthionocarbamate.

3. The method of inhibiting the growth of bacteria which comprises exposing said bacteria to a bacteriostatic amount of a composition comprising dimethylformamide and 4-methylphenyl 3,4-dichlorophenylthionocarbamate.

4. The method of inhibiting the growth of bacteria which comprises exposing said bacteria to a bacteriostatic amount of a composition comprising dimethylformamide and 3,4 - dichlorophenyl 3,4 - dichlorophenylthionocarbamate.

5. The method of inhibiting the growth of bacteria which comprises exposing said bacteria to a bacteriostatic amount of a composition comprising dimethylformamide and 4-ethoxyphenyl 3,4-dichlorophenylthionocarbamate.

6. The method of inhibiting the growth of bacteria which comprises exposing said bacteria to a bacteriostatic amount of a composition comprising dimethylformamide and 2,6-di-t-butyl - 4 - methylphenyl 3,4 - dichlorophenylthionocarbamate.

7. The method of inhibiting the growth of bacteria which comprises exposing said bacteria to a bacteriostatic amount of a composition comprising dimethylformamide and 3-nitrophenyl 3,4-dichlorophenylthionocarbamate.

8. A composition comprising a bacteriostatic amount of dimethylformamide and 3,4-dichlorophenylthionocarbamate having the formula:

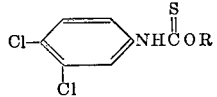

wherein R is selected from the group consisting of phenyl and phenyl substituted with at least one member selected from the group consisting of halogen atom, lower alkyl, lower alkoxy and nitro.

9. A composition comprising a bacteriostatic amount of dimethylformamide and phenyl 3,4-dichlorophenylthionocarbamate.

10. A composition comprising a bacteriostatic amount of dimethylformamide and 4-methylphenyl 3,4-dichlorophenylthionocarbamate.

11. A composition comprising a bacteriostatic amount of dimethylformamide and 3,4-dichlorophenyl 3,4-dichlorophenylthionocarbamate.

12. A composition comprising a bacteriostatic amount of dimethylformamide and 4-ethoxyphenyl 3,4-dichlorophenylthionocarbamate.

13. A composition comprising a bacteriostatic amount of dimethylformamide and 2,6-di-t-butyl-4-methylphenyl 3,4-dichlorophenylthionocarbamate.

14. A composition comprising a bacteriostatic amount of dimethylformamide and 3-nitrophenyl 3,4-dichlorophenylthionocarbamate.

15. A composition according to claim 8 dispersed in an extending agent.

16. A composition according to claim 8 dispersed in an extending agent selected from the group consisting of solid and semi-solid extending agents, the composition containing 0.1 to 25 percent by weight of said composition of claim 8.

17. A composition according to claim 8 dispersed in a liquid extending agent, the composition containing 0.001 to 50 percent by weight of said composition of claim 8.

(References on following page)

References Cited by the Examiner
UNITED STATES PATENTS

| | | | |
|---|---|---|---|
| Re. 24,868 | 9/1960 | Beaver et al. | 167—30 |
| 2,166,119 | 7/1939 | Bousquet | 167—22 |
| 2,166,120 | 7/1939 | Bousquet | 167—22 |
| 2,959,612 | 11/1960 | Beaver et al. | 167—30 |
| 3,001,908 | 9/1961 | Harrison | 167—22 |

OTHER REFERENCES

Chemical Abstracts I, 48:474$^h$, 1954 (abstract of Burchfield et al., Boyce Thompson Inst., 17, 333–4, 1953).

Chemical Abstracts II, 49:14, 171$^e$, 1955 (abstract of Cuckler et al., Science 122:244–5, 1955).

Chemical Abstracts III, 49:13, 576$^b$, 1955 (abstract of Gertler et al., Agr. Res. Ser., U.S. Dept. Agr. ARS–33–1, 9 pp., Sept. 1954).

Merck Index, 7th Edition, 1960, page 371.

JULIAN S. LEVITT, *Primary Examiner.*

MORRIS O. WOLK, FRANK CACCIAPAGLIA, JR.,
*Examiners.*